United States Patent
Dezonno et al.

(10) Patent No.: US 7,453,830 B2
(45) Date of Patent: Nov. 18, 2008

(54) INTERNET ARCHITECTURE FOR SOFTWARE BASED ACD

(75) Inventors: Anthony J. Dezonno, Bloomingdale, IL (US); Robert T. Eitel, Barlett, IL (US)

(73) Assignee: Rockwell Electronic Commerce Technologies, LLC, Wooddale, IL (US)

( * ) Notice: Subject to any disclaimer, the term of this patent is extended or adjusted under 35 U.S.C. 154(b) by 1327 days.

(21) Appl. No.: 10/235,751

(22) Filed: Sep. 5, 2002

(65) Prior Publication Data
US 2004/0047302 A1 Mar. 11, 2004

(51) Int. Cl.
H04L 12/66 (2006.01)
H04L 12/16 (2006.01)
H04Q 11/00 (2006.01)

(52) U.S. Cl. .............. 370/270; 370/260; 370/261; 370/352

(58) Field of Classification Search ......... 370/270–271, 370/352–357, 401, 396–397, 395.3, 395.52, 370/260, 261; 379/265.01–2, 265.04, 265.09, 379/265.11–13, 309
See application file for complete search history.

(56) References Cited

U.S. PATENT DOCUMENTS

| | | | |
|---|---|---|---|
| 5,555,179 A | 9/1996 | Koyama et al. | |
| 5,765,033 A | 6/1998 | Miloslavsky | |
| 5,926,539 A | 7/1999 | Shtivelman | |
| 5,946,387 A | 8/1999 | Miloslavsky | |
| 5,953,332 A | 9/1999 | Miloslavsky | |
| 5,953,405 A | 9/1999 | Miloslavsky | |
| 6,002,760 A | 12/1999 | Gisby | |
| 6,021,428 A | 2/2000 | Miloslavsky | |
| 6,044,145 A | 3/2000 | Kelly et al. | |
| 6,044,368 A | 3/2000 | Powers | |
| 6,067,357 A | 5/2000 | Kishinsky et al. | |
| 6,108,711 A | 8/2000 | Beck et al. | |
| 6,138,139 A | 10/2000 | Beck et al. | |
| 6,167,395 A | 12/2000 | Beck et al. | |
| 6,170,011 B1 | 1/2001 | Beck et al. | |
| 6,175,563 B1 | 1/2001 | Miloslavsky | |
| 6,175,564 B1 | 1/2001 | Miloslavsky et al. | |
| 6,185,292 B1 | 2/2001 | Miloslavsky | |
| 6,259,774 B1 | 7/2001 | Miloslavsky | 379/90 |
| 6,263,066 B1 | 7/2001 | Shtivelman et al. | 379/266 |
| 6,295,293 B1 * | 9/2001 | Tonnby et al. | 370/389 |

(Continued)

FOREIGN PATENT DOCUMENTS

| | | |
|---|---|---|
| EP | 0539104 A3 | 4/1993 |
| EP | 1073249 A2 | 1/2001 |
| WO | WO 99/45679 A1 | 9/1999 |
| WO | WO 00/49794 | 8/2000 |

Primary Examiner—Binh K Tieu
(74) Attorney, Agent, or Firm—Husch Blackwell Sanders Welsh & Katz

(57) ABSTRACT

A method and apparatus are provided for setting up a voice call between a client and one of a plurality of agents of an organization. The method includes the steps of detecting a contact request associated with the client determining a communication system address of the client based upon the detected contact request transferring a request to a router at a router Internet protocol address for a voice connection between the client at the determined address and one of the plurality of agents selecting an agent of the plurality of agents and forming a voice channel between the determined address of the client and an agent Internet protocol address of a terminal of the selected agent.

51 Claims, 3 Drawing Sheets

U.S. PATENT DOCUMENTS

| | | |
|---|---|---|
| 6,339,593 B1 | 1/2002 | Kikinis |
| 6,345,305 B1 | 2/2002 | Beck et al. |
| 6,359,981 B1 | 3/2002 | Neyman et al. ............. 379/265 |
| 6,373,836 B1 | 4/2002 | Deryugin et al. |
| 6,373,937 B1 | 4/2002 | Yegoshin ................... 379/266 |
| 6,389,007 B1 | 5/2002 | Shenkman et al. |
| 6,393,015 B1 | 5/2002 | Shtivelman |
| 6,404,736 B1 | 6/2002 | Arkko et al. ................ 370/230 |
| 6,611,590 B1 * | 8/2003 | Lu et al. ................ 379/265.09 |
| 6,732,156 B2 | 5/2004 | Miloslavsky |
| 6,822,945 B2 * | 11/2004 | Petrovykh ................... 370/270 |
| 6,829,349 B1 * | 12/2004 | Neale et al. ............ 379/265.09 |
| 7,269,160 B1 * | 9/2007 | Friedman et al. ............ 370/352 |
| 2001/0011228 A1 * | 8/2001 | Shenkman ................... 705/14 |
| 2001/0046209 A1 * | 11/2001 | Glassman ................... 370/230 |
| 2002/0194272 A1 | 12/2002 | Zhu |
| 2003/0021259 A1 | 1/2003 | Miloslavsky et al. |
| 2003/0026394 A1 * | 2/2003 | Chapman et al. ......... 379/93.01 |
| 2003/0065801 A1 * | 4/2003 | Eitel et al. .................. 709/231 |
| 2003/0128833 A1 * | 7/2003 | Peters ................... 379/265.09 |
| 2004/0193475 A1 * | 9/2004 | Hemm et al. .................. 705/9 |
| 2006/0140386 A1 * | 6/2006 | Morganstein et al. ....... 379/224 |
| 2006/0209797 A1 * | 9/2006 | Anisimov et al. ........... 370/352 |

* cited by examiner

INTERNET ARCHITECTURE FOR SOFTWARE BASED ACD

FIELD OF THE INVENTION

The field of the invention relates to communication systems and more particularly to automatic call distributors.

BACKGROUND OF THE INVENTION

Contact centers are generally known. Such centers are typically used as a means of facilitating contact between an organization using the contact center and large numbers of persons through the Internet or through conventional telephone systems.

Contact centers have generally evolved from call centers. Call-centers typically include at least three elements: an automatic call distributor (ACD), a group of agents for handling the calls, and a host computer containing customer information. The individual agents of the groups of agents are each typically provided with a telephone console and a computer terminal. The telephone terminal is used to deliver customer calls distributed to the agent by the ACD. The terminal may be used to retrieve customer records from the host.

Contact centers have typically been segregated to one or only a very few sites. Such segregation has been preferred to simplify the supervision of agents and to reduce the cost of the infrastructure needed to provide an agent with a telephone and to connect an agent terminal to the customer database.

More recently, it has become possible for agents to telecommute through a variety of communications system innovations. For example, the availability of integrated digital service network (ISDN) connections has allowed the telecommuting agent to use one ISDN connection for voice traffic while a second ISDN channel is used for data.

While the ability of agents to telecommute has drastically increased the pool of agents available to service the needs of businesses, the costs of the infrastructure needed to support and house a contact center have remained prohibitively high in an environment of declining profits. Accordingly, a need exists for a means of implementing the functionality of a call center without the infrastucture required by conventional call centers.

SUMMARY

A method and apparatus are provided for setting up a voice call between a client and one of a plurality of agents of an organization. The method includes the steps of detecting a contact request associated with the client, determining a communication system address of the client based upon the detected contact request, transferring a request to a router at a router Internet protocol address for a voice connection between the client at the determined address and one of the plurality of agents, selecting an agent of the plurality of agents and forming a voice channel between the determined address of the client and an agent Internet protocol address of a terminal of the selected agent.

DETAILED DESCRIPTION OF AN ILLUSTRATED EMBODIMENT

Figure 1:
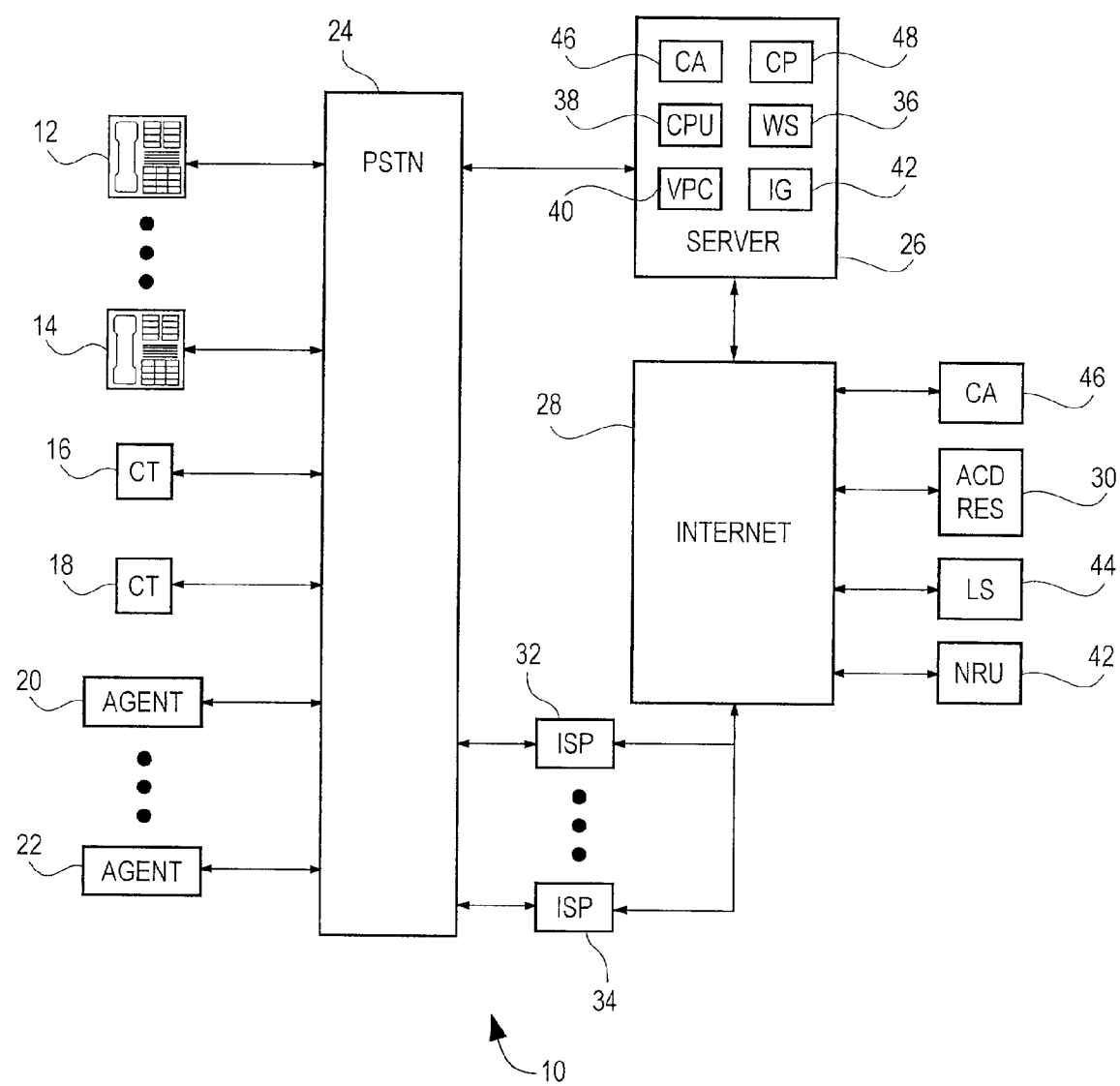
FIG. 1 depicts a contact processing system in accordance with an illustrated embodiment of the invention.

FIG. 1 depicts an Internet-based contact processing system 10, shown generally under an illustrated embodiment of the invention. The system 10 may be used by an organization (e.g., a merchant, a politician, an environmental organization, etc.) to connect clients (e.g., customers) 12, 14, 16, 18 with agents 20, 22 of the organization for purposes of advancing the agenda of the organization.

The system 10 may include a server 26 and a number of other contact processor resources 30. The contact processor resources 30 (FIG. 2) may include a router 66, a database 68, a real time engine 70, a conference controller 74 and a computer telephone interface (CTI) 76. Other resources contained within the database 68 may include a skills list for each agent 20, 22 and customer lists.

While the contact processor resources 30 are shown in a single location, it should be understood that the elements of the ACD resources 30 and of the system 10, in general, may be distributed among a number of physical locations. Further, the elements of the system 10 may not require a physical location at all and, in fact, need only exist as a set of computer applications installed on or transferred among computers as necessary to the proper functioning of the contact center.

While processing of the contacts is performed generally through the Internet 28, the voice connection between customers 12, 14, 16, 18 and agents 20, 22 of an organization operating the contact center 10 may generally be accomplished under any of a number of different formats. Under one format, the contact may be established under a voice over Internet protocol (VoIP) format between a terminal of the client and a terminal of the agent. Alternatively, the voice connection may be based at least partially upon a switched circuit connection though the public switch telephone network (PSTN) 24. It should also be understood that while the description below will focus on call received from customers 12, 14, 16, 18, the system 10 could just as easily also process calls directed to customers 12, 14, 16, 18.

Such a system 10 allows customers 12, 14, 16, 18 and agents 20, 22 to be located in virtually any geographic location. Further, the use of a combination of Internet and PSTN based resources allows time-sensitive information (i.e., voice information) to be routed in a manner that obviates delays and voice clipping.

Under illustrated embodiments of the invention, the organization using the system 10 may promulgate (by advertising or otherwise) a number of contact methods for speaking with an agent 20, 22 of the organization (e.g., telephone number, website address, etc.). Alternatively, the system 10 may maintain a list of present of potential customers and may place outgoing calls to customers.

In general, a communications analyzer 46 may receive calls and determine a communication system identifier of the customer 12, 14, 16, 18 associated with the call. In the case of an incoming telephone call, the communication system identifier may be an ANI number provided by the PSTN 24. In the case of an outgoing call, the communication system identifier may be the dialed number. Where the call is delivered through the Internet, the communication system identifier may be an Internet protocol (IP) address of the customer 16, 18.

The communication system identifier may be combined with other information about the call (called call associated information) and transferred to a communication processor 48. The communication processor 46 may function to compose a packet message that may be transferred to an Internet router.

In the case of incoming calls, a customer may access a server 26 of the system 10 using a plain old telephone service (POTS) telephone, or Internet ready telephone (e.g., webphone) 12, 14. (As used herein, the POTS telephone, Internet ready telephone or terminal of the customer may be referred to simply as the customer 12, 14, 16, 18.)

Alternatively, a customer may contact a website 36 of the organization using a terminal 16, 18. Displayed on one or more webpages downloaded from the website 36 may be an icon with the words "SPEAK WITH AGENT". In the situation where the customer activates the icon, a voice call may be set up between the customer 16, 18 and a selected agent 20, 22.

Figure 2:
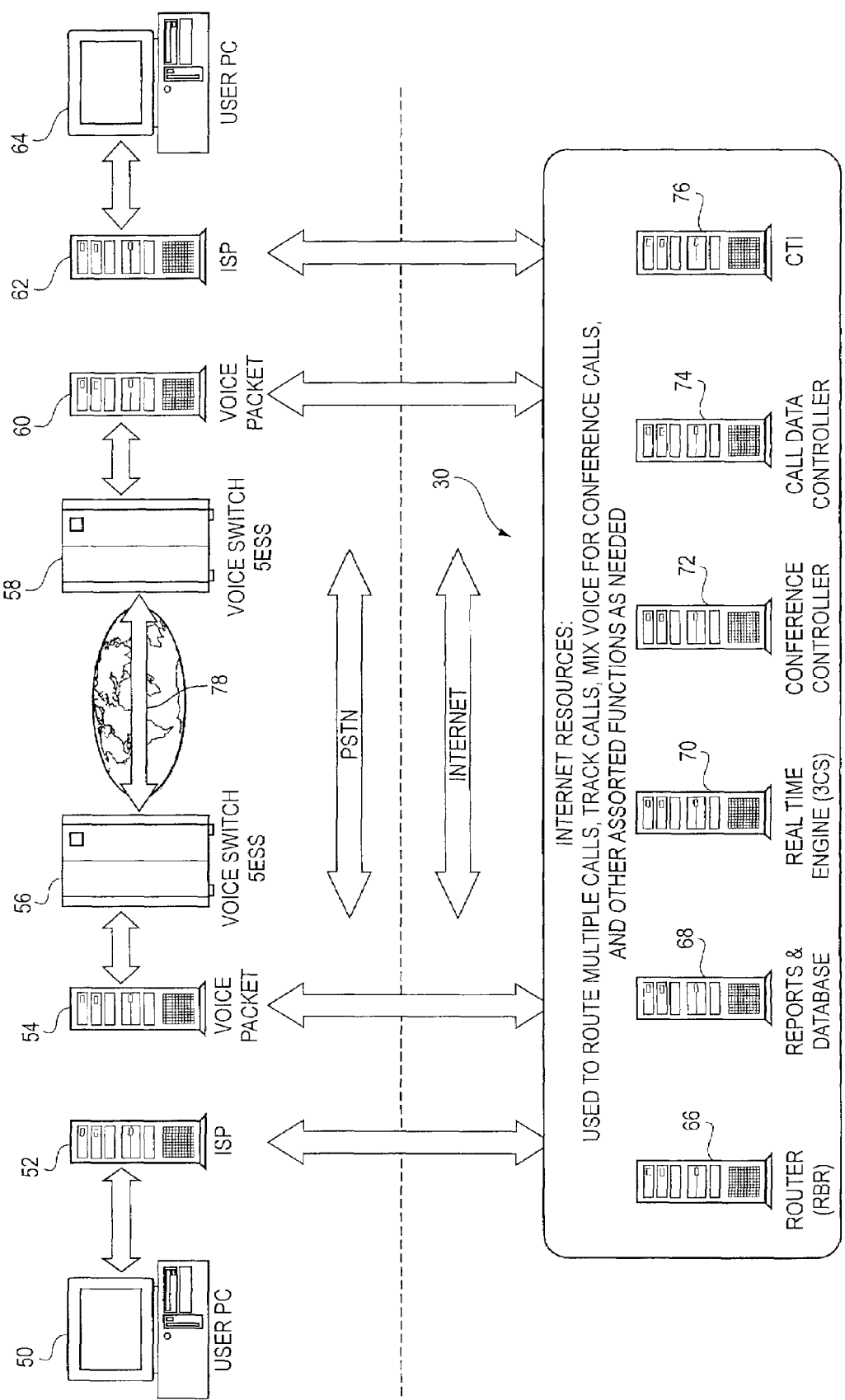
FIG. 2 is a simplified schematic of the system of FIG. 1.
Figure 3:
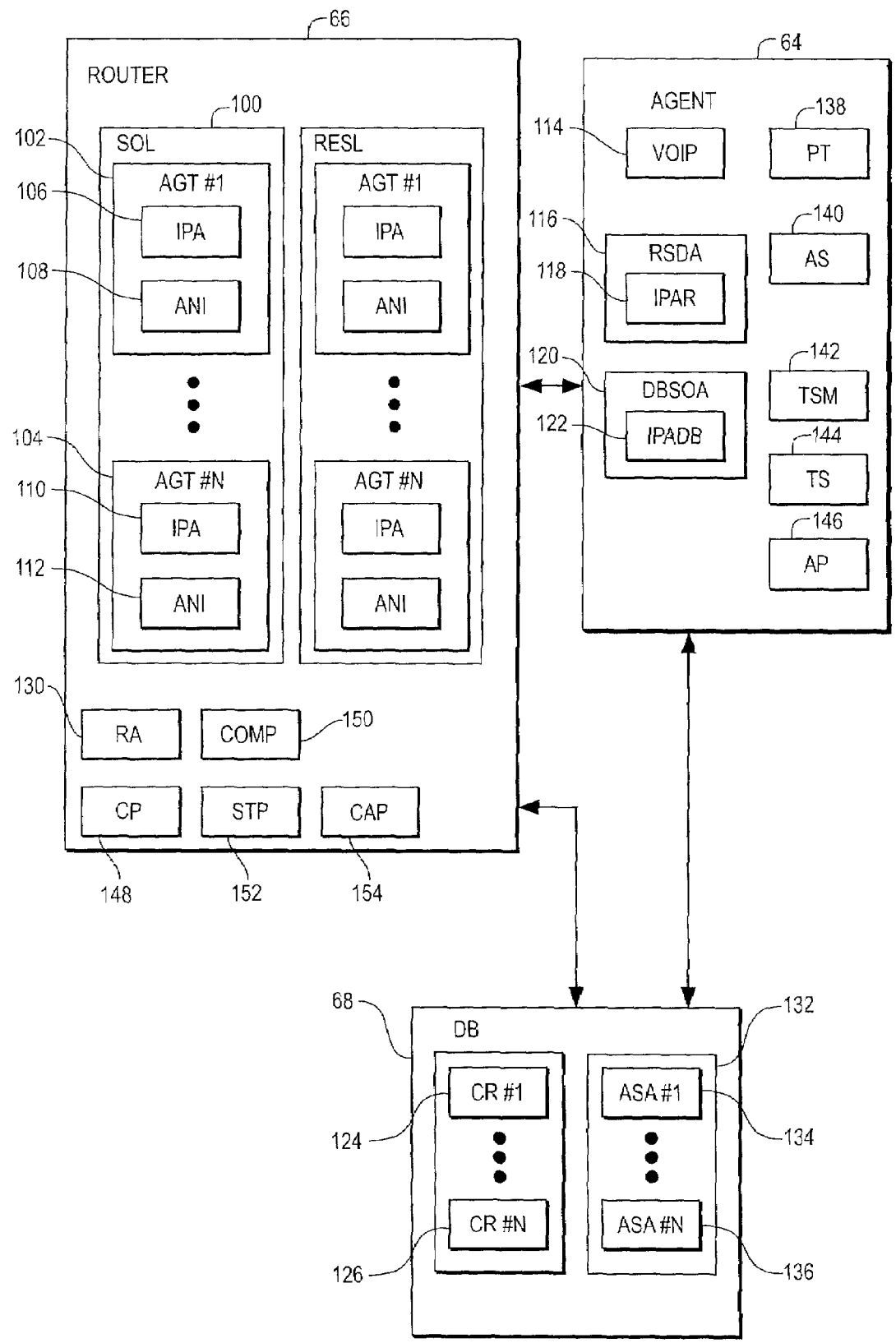
FIG. 3 is a simplified flow diagram of elements of FIG. 2.

FIG. 2 depicts a simplified diagram of the system 10 that may be used to describe the process of routing voice calls from customers 12, 14, 16, 18 to agents 20, 22. While FIG. 2 is set in the context of a call being routed from a computer of a customer 16, 18 to an agent 20, 22, the process of routing a call from a POTS telephone or Internet ready telephone 12, 14 is similar and will be readily apparent from the description below.

In the context of FIG. 2, the customer (now labeled 50) may access the website 36 and browse among a number of webpages (not shown). To access the website 36, the customer 50 may access the Internet through a local Internet Service Provider (ISP) 32, 24 (now labeled 52 in FIG. 2) and enter the Internet protocol (IP) address of the website 36 into a web browser (e.g., Netscape) and activate an ENTER button. In response, the browser may send an information request to the website 36 including at least the IP address of the customer 50.

Once the customer 50 has accessed the website, a central processing unit (CPU) 38 may open a call file 40 to collect call associated information (e.g., the IP address of the customer 50, webpages visited by the customer 50, etc.). As the customer 50 browses the webpages, he/she may activate the icon labeled "SPEAK WITH AGENT". In response, the CPU 38 may compose an access request and transfer the request through the Internet 28 to the IP address of a call router 66. The access request may include at least the call associated information of the customer 50.

Upon receiving the call request, the router 66 may parse the request to recover the IP address of the customer 50 and any webpages visited. The router 66 may then transfer an information request to a database 68 to identify the customer 50 based upon the IP address.

If the customer 50 is an existing customer, the search may identify and allow recovery of any customer records. Customer records may include an identifier of the geographic location of the customer 50 as well as any customer preferences (e.g., buying habits, favorite products, etc.). Any identified customer records may be transferred from the database 68 to the router 66.

Upon recovery of any customer records, the router 66 may transfer the customer records and call associated information to a routing application 130. Within the routing application 130, an agent 20, 22 is selected based upon qualifications in handling the call. For example, the routing application 130 may compare the webpages visited and any retrieved customer information with a skills list 136 of each agent. Where a match is found, the routing application may select the agent for assignment to the call.

The router 66 may also compare the webpages visited with a series of telescripts that may be used by a selectd agent. As is known, telescripts are written prompts intended to guide an agent during a conversation with a client based upon the perceived subject matter of the conversation. Selection and presentation to an agent of a telescript appropriate to the webpages visited allows the organization to optimize the use of agents during client contacts.

In order to facilitate a connection with an agent, each agent 64 may sign onto the system or may be automatically added depending upon the loading of the system 10. To sign-on, an agent 64 may activate a router sign-on application (RSOA) 116. The RSOA 116 dials a number of a local ISP 62. Upon accessing the Internet, the RSOA 116 may compose a sign-on packet using the IP address 118 of the router 66. Upon receiving the sign-on packet, the router 66 adds the agent 64 to the sign-on list 100.

Continuing the example above, the routing application 130 may retrieve a skills list 134, 136 for each agent 102, 104 contained within the signed-on list 100. The contents of the skills list 134, 136 may be compared with the content of the call associated information to select the most qualified agent.

Upon selection of an agent, a channeling application 148 may determine a routing protocol to be used in forming a voice connection between the client 50 and selected agent 64. As mentioned above, connection of the voice call between the customer 50 and the selected agent 64 may occur under any of a number of different formats. Under a first format, the voice information may be routed almost entirely through the Internet as a VoIP connection between the ISP 52 of the client 50 and the ISP 62 of the agent 64. Alternatively, the voice information may be routed at least partially through a switched circuit connection 78 of the PSTN 24.

The decision to route the voice information through a switched circuit connection 78 may be based upon voice quality and upon availability of voice to packet converters 54, 60. For example, a packet timer 138 within the agent terminal 64 may measure a variability of packet information arriving from the client 50. Where the timing of the arrival of packet information exceeds some threshold value, the packet timer 138 may signal the router 66 that the connection may need to be re-routed to improve voice quality.

As a first step, the router 66 may identify a voice to packet converter 54 near a location of the client 50. Similarly, the router 66 identifies voice to packet converter 60 near a location of the agent 64. The router 66 may then send instructions to a computer telephone interface unit 76 to form a switched circuit voice channel 78 between the two voice to packet converters 54, 60. As a final step the router 66 instructs the voice to packet converter 60 to address its packets to the agent 64 and the agent to address its packets to the voice to packet converter 60. Similarly, the router 66 instructs the voice to packet converter 54 to address its packets to the client 50 and the client 50 to address its packets to the voice to packet converter 54.

The addressing of packets may be accomplished under a format similar to that used by "DialPad.com". While DialPad.com is typically used by computer users to place outbound calls through the PSTN, the process used herein extends the concepts to substantially reverse the process at a call destination end.

For example, to accomplish voice channel set-up between the client 50 and agent 64, the CTI 76 may send a telephone number of the agent to the client's voice to packet converter 54 similar to the conventional method of operation of DialPad.com. The voice to packet converter 54 transfers the telephone number to the local exchange carrier 56 of the PSTN 24. The local exchange carrier 56 sets up the switched circuit connection 78 with the local exchange carrier 58 of the agent 64. However, if the agent 64 has signed-on to the system 10, then his telephone number would be busy and no further calls could be delivered.

In this case, the agent's telephone number is provided with a call forwarded number that coincides with the voice to packet converter 60. Since the agent's telephone is busy, the call is delivered to the voice to packet converter 60. Based upon the DNIS information delivered along with the call, the voice to packet converter 60 is able to identify the agent 64 as being the destination of the call. By reference to a memory, the voice to packet converter 60 retrieves an IP address, an alerting port 146 and a voice port 114 of the agent 64. Upon retrieval of the IP address and alerting port, the voice to packet converter sends an alerting message to the agent 64 notifying the agent 64 of the incoming call.

Delivery of the message to the alerting port 146 causes a call arrival icon to flash on a screen of the agent 64. Selection of the icon by the agent 64 causes the voice to packet converter 60 to begin exchanging voice information under a VoIP format with the voice port 114 of the agent's terminal 64.

As a final step of call set-up, the router 66 may transfer the identifier of the client 50 and a script identifier to the agent 64. The client identifier may be transferred to a data base sign-on application 120. Using the IP address 122 of the database 68, the data base sign-on application 120 forms a data link with the data base 68. Using the identifier of the client 50, the application 120 may download any appropriate customer records for display on the terminal 64 of the agent.

Similarly, the script identifier may be transferred to a telescript control function 142 within the agent terminal 64 that functions to download an appropriate telescript 144 through the data link with the data base 68. The downloaded telescript may be used by the agent 64 as a guide as the agent converses with the client 50.

Where the agent 64 is provided with a relatively fast connection (e.g., a cable modem, xDSL, etc.), the agent may be able to concurrently support multiple calls. As calls arrive, an icon is displayed for each call. As the agent 64 clicks on an icon, any previously connected call is placed on hold. Customer data and telescripts may be handled similarly.

Under another illustrated embodiment, a POTS telephone 12, 14 may dial a telephone number provided by the organization and be connected to a voice to packet converter 40 within the server 26. Alternatively, a webphone 16, 18 may dial an Internet gateway 42. In either case, a CPU 38 within the server 26 may collect call associated information such as ANI and DNIS.

Following conversion of the voice information from the POTS telephone 12, 14 into packet data, the call may be processed as previously described above. However, if more information is desired, the server 26 may connect the caller 12, 14 to a web based voice response unit (VRU) 42. The caller may be presented options and provide responses. The VRU 42 may detect the responses and provide the responses to the CPU 38 as additional call associated information.

In another illustrated embodiment of the invention, a conference controller 72 is provided to provide conferencing capabilities. Under the illustrated embodiment, additional callers may be added to the initial call between client 50 and agent 64. To allow conferencing, the conferencing controller is set up as the destination of all packets from each conference participant. Packets received from each participant are summed within the conference controller and averaged (i.e., divided by the number of participants) before being distributed as an outgoing packet to each participant.

Under another illustrated embodiment of the invention, a real time engine 70 is provided within the Internet to track any of a number of system events (e.g., agent talk time, average calls handled by each agent per minute, call set-up time, etc.). Events measured by the real time engine 70 may be stored within the database 68. Event tracking by the real time engine 70 may be accomplished by sending duplicate packets from the agent 64 and other resources 30 to the real time engine 70 whenever a system change occurs.

Under another illustrated embodiment of the invention, the system 10 may be operated as a distributed resource system based upon the use of networking object oriented programming (e.g., Remote Methods Invocation (RMI) and JINI by Sun Microsystems). Under the illustrated embodiment, call center agents 20, 22 may be regarded as network resources where agent services may be "leased" concurrently to multiple (packet switched) call centers 10. In this case, the Internet 28 is effectively used to aggregate staff.

For example, a contract agent 46 (not associated with any particular organization) may sign-on to the network using an appropriate device (e.g., personal data assistant (PDA), laptop, desktop, cell phone, etc.). Signing-on in this context may mean broadcasting a presence announcement by dropping a multicast packet into a well-known port of one or more systems 10.

A lookup service 44 may monitor the well-known port for presence announcements. When the lookup service 44 detects the presence announcement packet, it opens and inspects the packet. In this case, the presence announcement packet may announce that the sender is an agent and which allows the lookup service 44 to determine whether or not it should contact the sender of the packet for more information.

If the lookup service 44 decides that it has an interest in additional agents, then it contacts the agent directly by forming a TCP connection to the IP address and port number extracted from the presence announcement under an appropriate encryption arrangement (e.g., VPN). Using RMI, the lookup service 44 sends an object, called a service registrar, through the network to the agent.

The purpose of the service registrar object is to facilitate further communication with the lookup service 44. The agent invokes methods of the service registrar object to accomplish registration on (i.e., join) the lookup service 44.

To join the lookup service 44, the agent invokes the "register( )" method on the service registrar object, passing as a parameter an object called a "service item" to the lookup service 44. The service item is a bundle of objects that describe the agent (e.g., agent skills, interface options, etc.).

The service item may contain any number of objects including an object called a service object, which the system 10 may use to interact with the agent. The service item may also include a number of attributes, which can also be any object. An example of an attribute that may be included as a service item are identifiers of GUIs supported by the agent and objects that support data base activity.

To use contract agents, the router 66 may process calls and assign agents 20, 22 as described above. However, if the number of available agents in the signed-in list 100 should fall below some threshold value, then the router 66 may attempt to add agents.

To add agents, the router 66 may transfer a service template to the lookup service 44. The service template may delineate a skill set and set of interface options needed for a contract agent 46 to function within the system 10.

If the lookup service 44 matches the service template to an agent, then the contract agent 46 may be added to the signed-on list 100. Once added to the signed-on list 100, a contract agent processor 154 within the router 66 may download a connection object to the contract agent 46. The purpose of the connection object is to allow the contract agent 46 to download the software tools necessary to function in a manner similar to other agents 20, 22 within the system 10. The contract agent 46 invokes methods steps within the connection object (possibly under a VPN format) to download the data base sign-on application 122 and a script menu 142.

Upon assigning a call to the contract agent 46, the router 66 may transfer the call to the contract agent 46 as described above. The router 66 may also transfer a client identifier and a script identifier to the contract agent 46. In response, the contract agent 46 may invoke methods of the connection object to download customer records and a telescript to be followed in conversing with the client 50.

Once the voice connection with the client 50 is set up and the contract agent 46 has the customer records and script, the conversation may proceed in a manner similar to any other agent 20, 22. Later, if the number of agents in the signed-on list 100 should later exceed some upper threshold, then the contract agent 46 may be removed from the list 100.

While a preferred embodiment of the present invention has been illustrated and described, it will be understood that changes and modifications may be made therein without departing from the invention in its broader aspects.

The invention claimed is:

1. A method of setting up a voice call between a client and one of a plurality of agents of an organization, such method comprising the steps of:
   detecting a contact request associated with the client;
   determining a communication system address of the client based upon the detected contact request;
   transferring a request to a router at a router Internet protocol address for a voice connection between the client at the determined address and one of the plurality of agents;
   selecting an agent of the plurality of agents; and
   forming a voice channel between the determined address of the client and an agent Internet protocol address of a terminal of the selected agent, including setting up a switchboard circuit connection between a local exchange carrier of the client and a local exchange carrier of the selected agent and routing voice information between the local exchange carrier of the selected agent and a voice to packet converter.

2. The method of setting up the voice call as in claim 1 further comprising setting up a data link between a predetermined Internet protocol address of a customer database and the Internet protocol address of the terminal of the selected agent.

3. The method of setting up the voice call as in claim 2 further comprising transferring the determined address of the client to the selected agent.

4. The method of setting up voice call as in claim 3 further comprising downloading customer records through the data link between the customer data base and terminal of the selected agent based upon the determined address of the client.

5. The method of routing the voice call as in claim 4 wherein the step of detecting the call further comprises receiving call associated information along with the contact request.

6. The method of routing the voice call as in claim 5 wherein the step of determining the communication system address of the client further comprises defining the call associated information as an automatic number identifier.

7. The method of routing the voice call as in claim 6 wherein the step of determining the communication system address of the client further comprises defining the call associated information as an Internet protocol address.

8. The method of routing the voice call as in claim 7 wherein the step of determining the communication system address of the client further comprises defining the call associated information as a dialed number identification service number.

9. The method of routing the voice call as in claim 8 wherein the step of transferring the request for voice connection comprises transferring the call associated information to the router at the router Internet-protocol address.

10. The method of setting up the voice call as in claim 1 further comprising comparing web pages visited by the client with a plurality of telescripts, and selecting telescripts appropriate to the web pages for presentation to the selected agent.

11. The method of setting up the voice call as in claim 1 further comprising setting up a data link for exchanging packetized voice information between a port of the voice to packet converter and a port within a terminal of the signing-on agent.

12. The method of setting up the voice call as in claim 1 further comprising comparing a total number of the plurality of agents with a threshold value.

13. The method of setting up the voice call as in claim 12 further comprising sending a service template to a lookup service when the number of the plurality of agents exceeds the threshold.

14. The method of setting up the voice call as in claim 13 wherein the step of sending a service template further comprising identifying a contract agent for receiving calls.

15. The methods of setting up the voice call as in claim 14 further comprising downloading a connection object to the contract agent.

16. An apparatus for setting up a voice call between a client and one of a plurality of agents of an organization, such apparatus comprising:
   means for detecting a contact request associated with the client;
   means for determining a communication system address of the client based upon the detected contact request;
   means for transferring a request to a router at a router Internet protocol address for a voice connection between the client at the determined address and one of the plurality of agents;
   means for selecting an agent of the plurality of agents;
   means for comparing a total number of the plurality of agents with a threshold; and
   means for forming a voice channel between the determined address of the client and an agent Internet protocol address of a terminal of the selected agent.

17. The apparatus for setting up the voice call as in claim 16 further comprising means for setting up a data link between a predetermined Internet protocol address of a customer database and the Internet protocol address of the terminal of the selected agent.

18. The apparatus for setting up the voice call as in claim 17 further comprising means for transferring the determined address of the client to the selected agent.

19. The apparatus for setting up the voice call as in claim 18 further comprising means for downloading customer records through the data link between the customer data base and terminal of the selected agent based upon the determined address of the client.

20. The apparatus for routing the voice call as in claim 19 wherein the means for detecting the call further comprises means for receiving call associated information along with the contact request.

21. The apparatus for routing the voice call as in claim 20 wherein the means for determining the communication system address of the client further comprises defining the call associated information as an automatic number identifier.

22. The apparatus for routing the voice call as in claim 21 wherein the means for determining the communication system address of the client further comprises defining the call associated information as an Internet protocol address.

23. The apparatus for routing the voice call as in claim 22 wherein the means for determining the communication system address of the client further comprises defining the call associated information as a dialed number identification service number.

24. The apparatus for routing the voice call as in claim 23 wherein the means for transferring the request for voice connection comprises means for transferring the call associated information to the router at the router Internet-protocol address.

25. The apparatus for setting up the voice call as in claim 16 further comprising means for receiving a sign-on request from an agent of the plurality of agents.

26. The apparatus for setting up a voice call as in claim 16 wherein the means for forming the voice channel further comprises means for setting up a switched circuit connection between a local exchange carrier of the client and a local exchange carrier of the selected agent.

27. The apparatus for setting up the voice call as in claim 26 further comprising means for routing voice information between the local exchange carrier of the signing-on agent and a voice to packet converter.

28. The apparatus for setting up the voice call as in claim 27 further comprising means for setting up a data link for exchanging packetized voice information between a port of the voice to packet converter and port within a terminal of the signing-on agent.

29. The apparatus for setting up the voice call as in claim 16 further comprising means for sending a service template to a lookup service when the number of the plurality of agents exceeds the threshold.

30. The apparatus for setting up the voice call as in claim 29 wherein the means for sending a service template further comprising means for identifying a contract agent for receiving calls.

31. The apparatus for setting up the voice call as in claim 30 further comprising means for downloading a connection object to the contract agent.

32. An apparatus for setting up a voice call between a client and one of a plurality of agents of an organization, such apparatus comprising:
a server adapted to detect a contact request associated with the client;
a communication analyzer adapted to determine a communication system address of the client based upon the detected contact request;
a communication processor adapted to transfer a request to a router at a router Internet protocol address for a voice connection between the client at the determined address and one of the plurality of agents;
a routing application adapted to select an agent of the plurality of agents; and
a channel processor adapted to form a voice channel between the determined address of the client and an agent Internet protocol address of a terminal of the selected agent, the voice channel comprising a switched circuit connection between a local exchange carrier of the client and a local exchange carrier of the selected agent, and a voice packet converter adapted to route voice information between the local exchange carrier of the selected agent and a voice to packet converter.

33. The apparatus for setting up the voice call as in claim 32 further comprising a data link adapted to downloading the customer records between an Internet customer data base and terminal of the selected agent based upon the determined address of the client.

34. The apparatus for routing the voice call as in claim 32 wherein the communication system address of the client further comprises a dialed number identification service number.

35. The apparatus for routing the voice call as in claim 32 wherein the communication system address of the client further comprises an Internet protocol address.

36. The apparatus for setting up the voice call as in claim 32 further comprising a data link adapted to exchange packetized voice information between a port of the voice to packet converter and a port within a terminal of the signing-on agent.

37. The apparatus for setting up the voice call as in claim 32 further comprising a comparator adapted to compare a total number of the plurality of agents with a threshold value.

38. The apparatus for setting up the voice call as in claim 37 wherein the service template process further comprising a lookup service adapted to identify a contract agent for receiving calls.

39. The apparatus for setting up the voice call as in claim 38 further comprising a service template processor adapted to send a service template to the lookup service when the number of the plurality of agents exceed the threshold.

40. The apparatus for setting up the voice call as in claim 39 further comprising a contract agent processor adapted to download a connection object to the contract agent.

41. A method of routing a voice call between a client and one of a plurality of agents of an organization, such method comprising the steps of:
detecting a call by a server with the client requesting a voice connection with an agent of the plurality of agents of the organization;
forming a switched circuit voice connection between a local exchange carrier of the client and a local exchange carrier of the agent; and
forming a voice over Internet protocol connection between the local exchange carrier of the agent and a terminal of the agent.

42. The method of routing the voice call as in claim 41 wherein the step of detecting the call further comprises receiving call associated information along with the request.

43. The method of routing the voice call as in claim 42 wherein the step of receiving the call associated information further comprises defining the call associated information as an automatic number identifier.

44. The method of routing the voice call as in claim 43 wherein the step of receiving the call associated information further comprises defining the call associated information as an Internet address.

45. The method of routing the voice call as in claim 44 wherein the step of receiving the call associated information further comprises defining the call associated information as a dialed number identification service number.

46. The method of routing the voice call as in claim 44 wherein the step of receiving the call associated information further comprises transferring the call associated information to an Internet-based responsibility based router.

47. The method of routing the voice call as in claim 46 wherein the step of transferring the call associated information to the responsibility based router further comprises selecting the one agent of the plurality of agents based upon the call associated information.

48. The method of routing the voice call as in claim 47 further comprising transferring a telephone system identifier of the selected agent to the server.

49. The method of routing the voice call as in claim 48 further comprises transferring the call to the telephone system identifier of the selected agent.

50. The method of routing the voice call as in claim 49 further comprises setting up a data link between a graphical user interface of the agent and an Internet based organizational database.

51. The method of routing the voice call as in claim 50 wherein the step of setting up a data link further comprises downloading customer records to the selected agent based upon the call associated information.

* * * * *